US006476862B1

(12) United States Patent
Tatsumi et al.

(10) Patent No.: US 6,476,862 B1
(45) Date of Patent: *Nov. 5, 2002

(54) TELECONFERENCE IMAGE INPUT DEVICE

(75) Inventors: Shingo Tatsumi, Kawasaki; Atsushi Ohyama, Yokohama; Hiroyuki Kawahara, Kawasaki; Tetsuya Hamada, Omiya, all of (JP)

(73) Assignee: Canon Kabushiki Kaisha (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/565,221

(22) Filed: Nov. 30, 1995

Related U.S. Application Data

(63) Continuation of application No. 08/123,836, filed on Sep. 20, 1993, now abandoned.

(30) Foreign Application Priority Data

Sep. 21, 1992 (JP) .............................. 4-276620
Dec. 25, 1992 (JP) .............................. 4-358961
Jan. 29, 1993 (JP) .............................. 5-34824

(51) Int. Cl.$^7$ .................. H04N 5/225; H04N 5/232; H04N 7/14
(52) U.S. Cl. .............. 348/211; 348/14.08; 348/223; 348/296; 348/347; 348/373
(58) Field of Search .................. 348/15, 211, 373, 348/345, 223, 212, 213, 14.03, 14.05, 14.08, 14.09, 14.1; H04N 7/15

(56) References Cited

U.S. PATENT DOCUMENTS

| 4,516,156 A | * 5/1985 | Fabris et al. .................. 348/15 |
|---|---|---|
| 4,980,761 A | * 12/1990 | Natori .......................... 348/15 |
| 5,111,288 A | * 5/1992 | Blackshear ................... 348/143 |
| 5,128,770 A | * 7/1992 | Inana et al. .................. 348/373 |
| 5,206,721 A | * 4/1993 | Ashida et al. ................. 348/15 |
| 5,311,230 A | * 5/1994 | Ogawa ................... 354/195.12 |
| 5,453,784 A | * 9/1995 | Krishnan ..................... 348/348 |
| 5,589,875 A | * 12/1996 | Fujita .......................... 348/211 |
| 5,742,329 A | * 4/1998 | Masunaga et al. ............. 348/15 |
| 5,757,418 A | * 5/1998 | Inagaki ........................ 348/15 |
| 5,801,770 A | * 9/1998 | Paff ............................. 348/211 |
| 5,838,368 A | * 11/1998 | Masunaga .................... 348/211 |

FOREIGN PATENT DOCUMENTS

| JP | 4323990 | * 11/1992 | ............. H04N/7/15 |
|---|---|---|---|
| JP | 5199521 | * 8/1993 | ............. H04N/7/15 |
| JP | 5207450 | * 8/1993 | ............. H04N/7/15 |

* cited by examiner

Primary Examiner—Wendy R. Garber
Assistant Examiner—Ngoc-Yen Vu
(74) Attorney, Agent, or Firm—Morgan & Finnegan, LLP

(57) ABSTRACT

An image input device having: an image pickup unit to photograph an object and generate an image signal; an optical axis control unit to enable an optical axis of the image pickup unit to be moved; and a control unit to interlockingly control the optical axis control unit and the image pickup unit is described. The image input device may also have signal processing means for performing predetermined processes on the image signal, such as white balancing and automatic focusing. The image input device in accordance with the present invention is particularly suited for use in a television conferencing system.

35 Claims, 13 Drawing Sheets

TELECONFERENCE IMAGE INPUT DEVICE

This appln. is a cont. of Ser. No. 08/123,836 filed Sep. 20, 1993 Abandoned.

BACKGROUND OF THE INVENTION

1. Field of the Invention

The invention relates to an image input device having a mechanism for enabling a photographing range to be moved and a mechanism for controlling an image state of the photographed image.

2. Related Background Art

In recent years, a video camera is widely used as an image input device for a computer.

Particularly, as a system in which a video camera and a computer or the like (for example, personal computer or work station) are combined, an electronic mail of an image or a television (TV) conference system is being used.

Hitherto, as a video camera apparatus of the image input device which is used in such an application field, a video camera which has been developed for the application for monitoring, a video camera having a lens which can be controlled by a remote operation, and the like have been known.

In case of using such an image input device for a television conference, however, there are the following various kinds of problems to be solved.

In the image input device as mentioned above, since an angle of camera cannot be remotely controlled, in case of using the image input device in a TV conference or the like, in order to change a photographing range, a plurality of video camera must be prepared and switched, so that its use efficiency is bad.

The video camera has an auto white balance function and an auto focusing function, or the like in which a state of the photographed image is automatically adjusted.

The auto focusing function is a function to automatically adjust a focal point to an in-focus state.

The auto white balance function will now be described.

Even in case of the same object, under different light sources, the spectral characteristics of the light which is reflected from the object are changed by being influenced by the spectral characteristics (light source color) of the light source, so that the color tone of the image plane differs. In this case, however, according to the human feeling, the man feels such that a special color, for example, white on the image plane is sensed as a color different from white which the man himself has stored or felt, so that there is a case where he feels unpleasant. The video camera, accordingly, has an auto white balance (AWB) function adjusting the color tone in accordance with the light source, thereby automatically adjusting the color tone so that the white color can be always seen as white at a predetermined level even under the light source.

As a method of white balance (WB) adjusting methods, there has conventionally been known a method whereby with reference to color difference signals R-Y and B-Y which are obtained by processing a plurality of chrominance signals obtained by, for example, a CCD or the like as an image pickup element, chrominance signals of, for example, three colors of R, G, and B, a control operation to change ratios among the chrominance signals R, G, and B in a manner such that the values obtained by integrating the color difference signals for a certain period of time become mininum is executed, thereby adjusting the WB.

In the video camera having such a WB adjusting function, there is a video camera such that just after the power source was turned on, the WB adjusting operation is automatically executed, thereby enabling a good image of a well-balanced WB to be obtained just after the turn-on of the power source.

However, when the WB adjusting operation of the camera is executed during the pan operation or tilt operation for changing the photographing range, the color of the image which is obtained from the CCD is unstable and the image becomes hard to see.

In case of the TV conference system since information is digitally transmitted, when an amount of information of the image data which is transmitted increases, it takes a time to transmit the information. A time difference occurs between the transmission side and the reception side. Such a drawback becomes a serious problem in a TV conference system which needs to execute operations in a real-time manner.

SUMMARY OF THE INVENTION

The invention is made under such circumstances and it is an object of the invention to solve the above problems and to provide an image input device which is particularly effective when the apparatus is used in a TV conference system.

To accomplish the above object, according to one preferred embodiment of the invention, there is provided an image input device comprising: image pickup means for photographing an object image; signal processing means for executing a predetermined signal process to an image signal that is generated from the image pickup means; an optical axis control means for changing an optical axis of a field of view which is photographed by the image pickup means; and control means for interlockingly controlling the image pickup means and the optical axis control means.

The above and other objects, features, and advantages of the invention will become apparent from the following detailed description taken in conjunction with the appended claims with reference to the accompanying drawings.

DETAILED DESCRIPTION OF THE PREFERRED EMBODIMENTS

Figure 1:
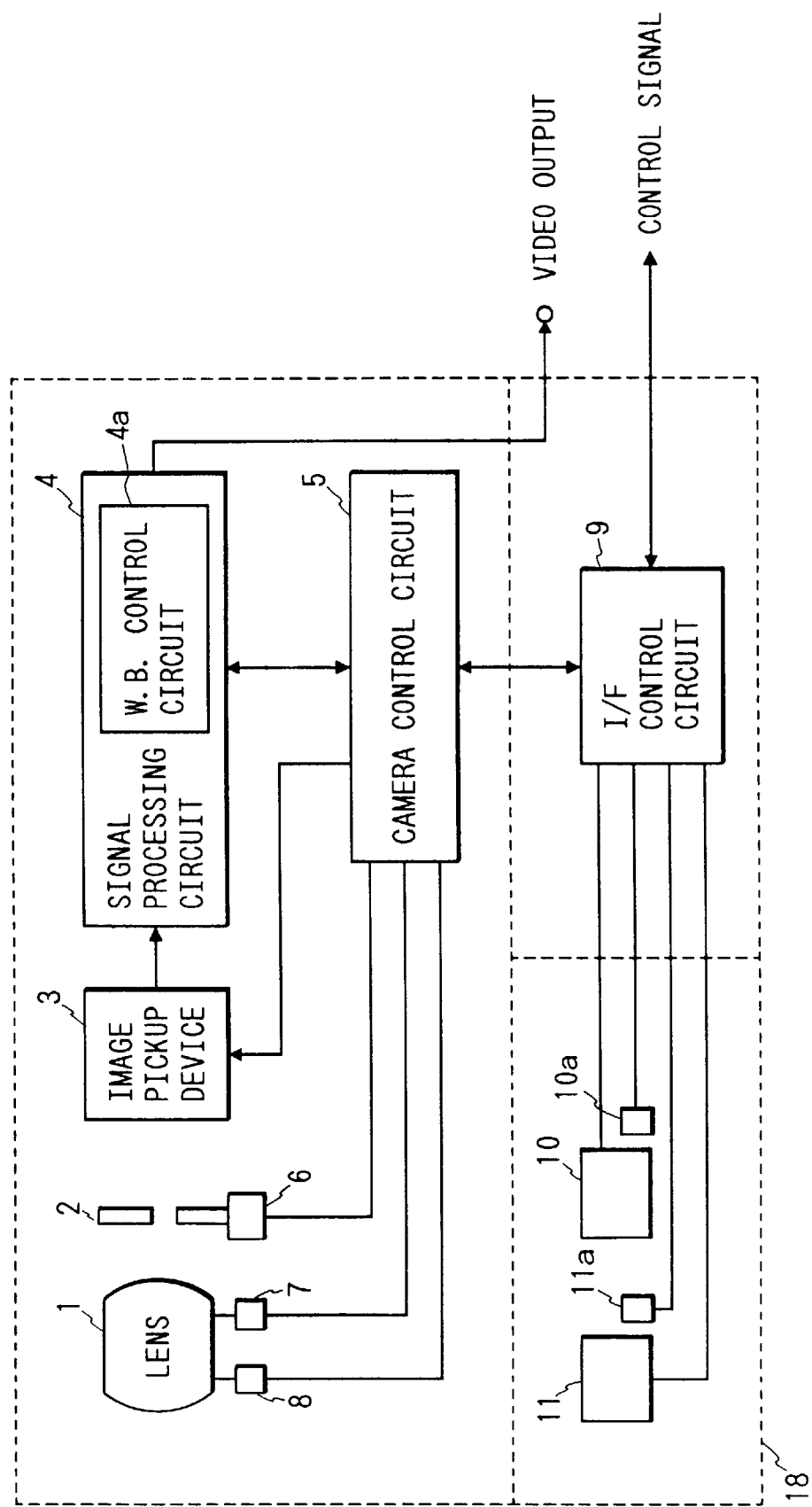
FIG. 1 is a schematic block diagram showing an embodiment of the image input device of the invention.

An embodiment of an image input apparatus of the invention will now be described with reference to the drawings. FIG. 1 is a block diagram showing a schematic construction of the image input device of the embodiment.

In FIG. 1, the light from an object (not shown) passes through a lens 1 and an iris device 2 and reaches an image pickup device 3.

The image pickup device 3 photoelectrically converts the light from the object and generates an electric signal and sends to a signal processing circuit 4. The signal processing circuit 4 executes necessary signal processes to the inputted electric signal and produces a video signal and generates to the outside. For example, a WB control circuit 4a to control the white balance (WB) is included in the signal processing circuit 4. The video signal produced as mentioned above is connected to a codec in, for example, a television (TV) conference system.

On the other hand, the video signal is sent from the signal processing circuit 4 to a camera control circuit 5. The camera control circuit 5 is constructed by, for example, a small electronic computer and controls an iris drive circuit 6 in accordance with the level of the inputted video signal. Due to this, the iris device 2 is driven and is controlled so as to keep the video signal level constant. A drive amount by the iris drive circuit 6 can be adjusted by the camera control circuit 5 in accordance with information which is given from an I/F control circuit 9.

The camera control circuit 5 generates control signals to a focus control circuit 7 and a zoom control circuit 8 and controls them, thereby controlling a focus amount and a zoom amount of the lens. Such zoom and focus controls can be performed in accordance with the information from the I/F control circuit 9.

On the other hand, the camera control circuit extracts, for example, a high frequency component of the inputted video signal and can also drive the focus control circuit 7 so that the high frequency component amount becomes maximum. Namely, the camera control circuit 5 can also execute what is called an auto focus operation. The camera control circuit 5 can also control processing parameters which are necessary in the signal processing circuit 4 and image pickup device 3.

The camera control circuit 5 executes the transmission and reception (communication) with the I/F control circuit 9. The I/F control circuit 9 is connected to an external apparatus (for example, personal computer or work station) and can communicate therewith (for example, serial communication).

The I/F control circuit 9 can change the photographing direction by controlling a horizontal direction drive device 10 and a vertical direction drive device 11 which construct an optical axis control device 18. In the horizontal and vertical movable portions of the drive devices 10 and 11, a horizontal position detecting device 10a and a vertical position detecting device 11a are provided in order to detect the position information. The position information detected by the detecting devices 10a and 11a are sent to the I/F control circuit 9.

By concentratedly managing the optical axis control system, camera control system, lens control system, and communication system with the outside by one control circuit 5 as mentioned above, a more proper control can be performed and a good image quality can be obtained.

The above point will now be specifically explained. In case of using the digital image transmission at the TV conference or the like hitherto, image information is compressed in order to reduce an amount of information which is transmitted. For example, there is a block coding method of the CCITT Recommendation (H.61) as a method which is well known as a compressing method of image information. In case of an image which vigorously moves, however, a compression ratio decreases and an amount of information to be transmitted is insufficient, so that there is a problem such that a reconstructed image becomes hard to see. Particularly, in case of changing a photographing range (in case of moving it in the horizontal and vertical directions), a whole image plane changes, so that a block distortion occurs in the whole image plane of the reconstructed image and the reconstructed image is extremely hard to see.

To avoid such problems, according to the embodiment, for instance, by deviating a focus of the lens before the optical axis control device is driven, the information amount of the image is reduced. After that, the optical axis control device is driven. The focus of the lens is adjusted after the optical axis control device was stopped.

The image input device of the embodiment has a WB control function. The WB control operation will now be described hereinbelow.

After the power supply of the image input device was turned on and predetermined initialization operations were finished (which will be explained hereinlater), the operation of the WB control circuit 4a is started. The WB control operation is stopped at a time point of the end of the WB adjustment. A WB control method is substantially the same as the method described in the foregoing conventional technique. At this time point, it is not always necessary to stop the WB control operation and no problem occurs even when the operation is continued.

In the case where the operation of the optical axis control device 18 is started by a control signal from the outside for a period of time during which the WB control operation is continued by the WB control circuit 4a, the operation of the WB control circuit 4a is stopped by the camera control circuit 5. During the operation of an optical axis control device 18, all of instruction signals such as to start the operation of the WB control circuit 4a are ignored.

When the operation of the optical axis control device 18 is finished by a control signal from the outside, the camera control circuit 5 receives a signal indicative of the end of the operation of the optical axis control device 18 from the I/F control circuit 9 and starts the WB control operation by the WB control circuit 4a. When the white balance is obtained, the WB control operation is finished or can be also continued as it is.

In a state in which the WB control operation by the WB control circuit 4a is stopped, the operation of the optical axis control apparatus 18 is started by the control signal from the outside. During the operation of the optical axis control device 18, all of the instruction signals so as to start the operation of the WB control circuit 4a by the camera control circuit 5 are ignored.

When the operation of the optical axis control device 18 is finished by the control signal from the outside, the camera control circuit 5 receives the signal indicative of the completion of the operation of the optical axis control device 18 from the I/F control circuit 9 and starts the WB control operation by the WB control circuit 4a. When the WB is obtained, the WB control operation is finished or can be also continued as it is.

That is, in the embodiment, as mentioned above, when the I/F control circuit 9 receives the signal to control the operation of the optical axis control device 18, the horizontal direction drive device 10 and the vertical direction drive device 11 are driven and the camera control circuit 5 is controlled so as to deviate the focus. By this method, since a defocusing state is obtained for a period of time during which the whole image plane is moving, the high frequency component of the image decreases. Therefore, since an image information amount decreases, a block distortion is also reduced and a good image is derived.

When the I/F control circuit 9 stops the horizontal direction drive device 10 and the vertical direction drive device 11, the camera control circuit 5 is also controlled so as to simultaneously make the auto focusing control and the WB control operative. Due to this, simultaneously with the stop of the drive devices 10 and 11, the focus and WB can be correctly adjusted and a good image is derived. It is more preferably to start the WB adjustment after completion of the focusing adjustment. An outline of such a state is shown in a timing chart of FIG. 2.

Figure 2:
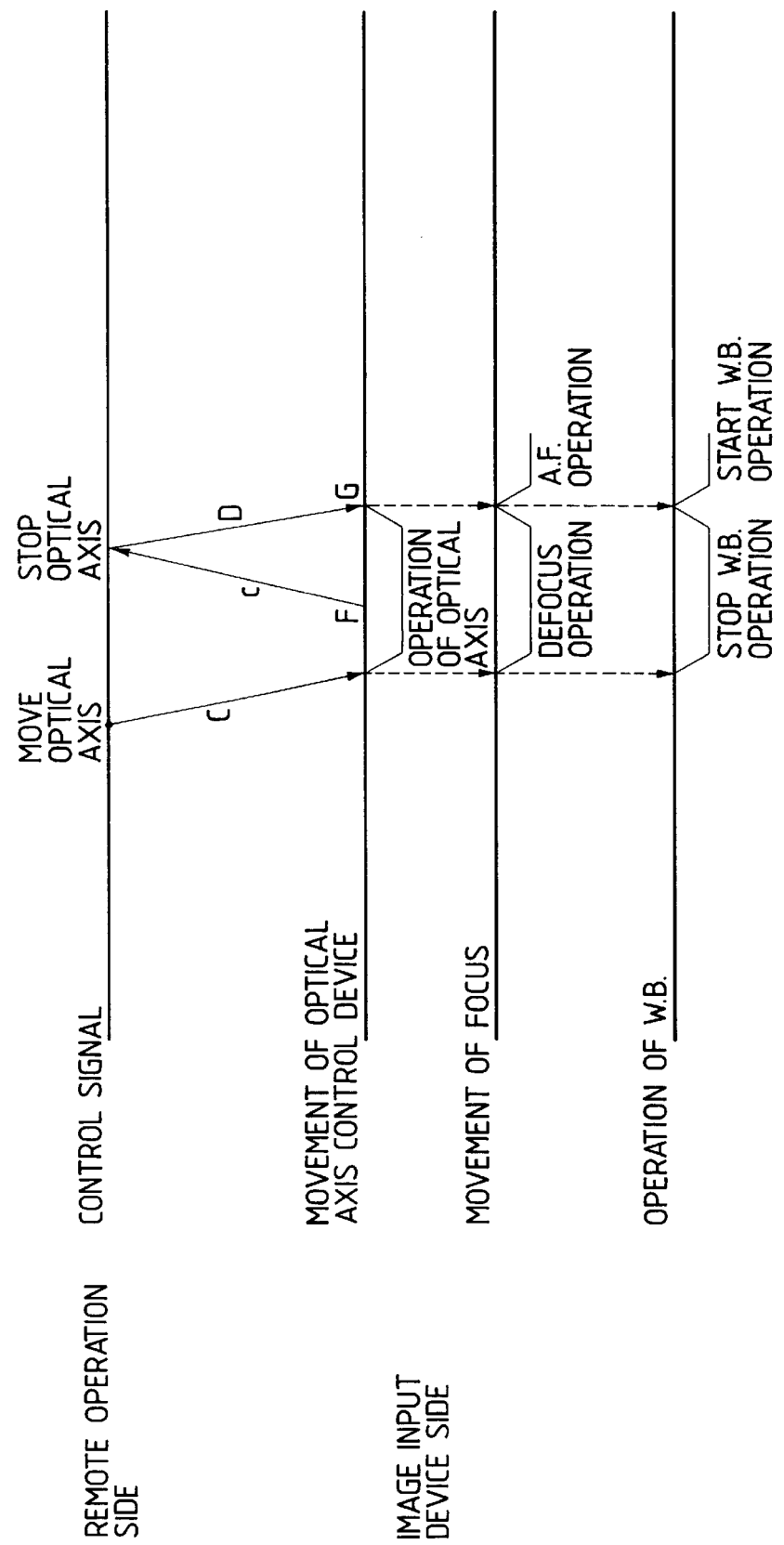
FIG. 2 shows an example of schematic timings of the remote operation according to the invention and is a timing chart showing an example in the case where an optical axis control device and a focus control as interlocked.

In FIG. 2, an axis or abscissa denotes a time base and oblique arrows C, D, and c in the diagram show the transfer of information. The arrows C and D indicate signals for control which are sent from a remote operation unit to the image input device. The arrow c indicates an image signal which is sent from the image input device to the remote operation unit.

In FIG. 2, the case where the driving of the optical axis control device 18 is stopped while looking at the image sent to the external operation unit side has been described.

As shown in the following example, however, by constructing in a manner such that a control signal indicating "in which direction ($\alpha$) by which amount ($\beta$)" the optical axis control device 18 should be driven is sent from the remote operation unit side, an overoperation as shown in F-G in FIG. 2 is eliminated and the good operation can be executed.

Figure 3:
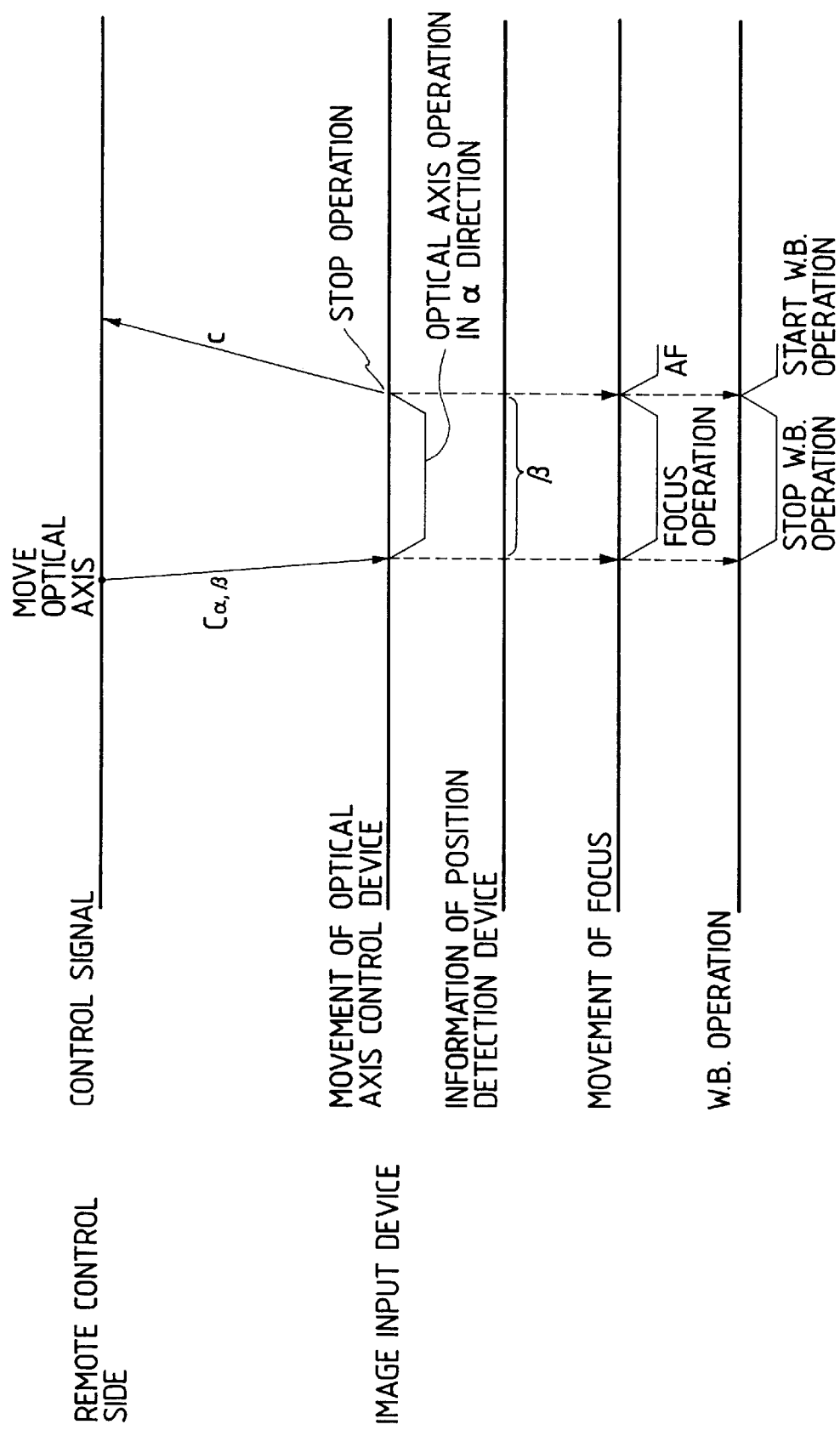
FIG. 3 shows an example of schematic timings of the remote operation according to the invention and is a timing chart showing an example in the case where the optical axis control device, a focus control, and a position detection are interlocked.

A schematic timing chart of FIG. 3 shows an example in which such an operation is allowed to be executed.

In FIG. 3, suffixes added to the control signal C denote a code ($\alpha$) indicative of the direction and a code ($\beta$) indicative of a drive amount.

As will be obviously understood from FIG. 3, when the control signal is sent from the remote control side to the image input device side, the optical axis is operated in the a direction by the optical axis control device 18 and, at the same time, the camera control unit 5 is controlled so as to obtain an out-of-focus state. When a fact that the optical axis was driven by only $\beta$ is known from the information of the position detecting device (10a or 11a), the I/F control circuit 9 stops the motion of the optical axis control device 18 and, at the same time, makes the AF mechanism and WB control operative, thereby allowing a good image to be obtained.

An embodiment of the image input device according to the invention will now be described. As an embodiment, in case of using a solid state photographing device as a photographing device, there is a method whereby when the optical axis control device is driven, by setting an accumulation time of the image pickup element to be longer than that in the ordinary photographing mode (field accumulation or frame accumulation) in place of deviating the focus, a space frequency of the image is reduced. In this case, since the operations are substantially the same as those in the schematic timing chart in the embodiment mentioned above except the switching step of the accumulating mode, only switching means of the accumulating mode will now be described.

Figure 4:
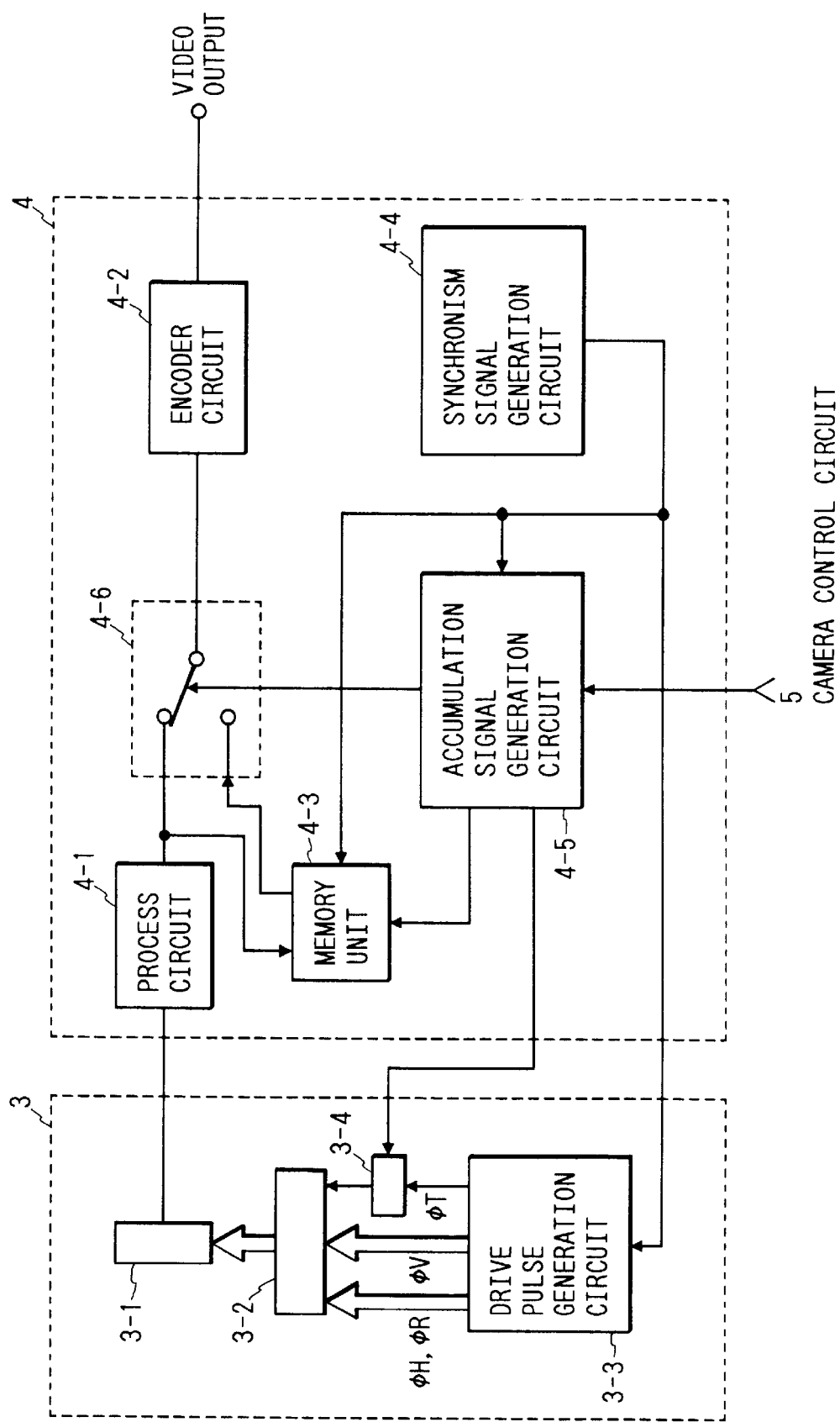
FIG. 4 is a schematic block diagram for explaining an example of an accumulation control according to the invention.

FIG. 4 is a schematic block diagram showing a construction of an embodiment of the portion regarding the switching of the accumulating mode. In FIG. 4, the same portions as those in FIG. 1 to explain the foregoing embodiment are designated by the same reference numerals.

In FIG. 4, the light from an object (not shown) is photoelectrically converted by a solid state image pickup element 3-1. For example, the solid state image pickup element 3-1 is constructed by a CCD image pickup device of the interline type and time-sequentially generates a video signal and sends to a process circuit 4-1 at the post stage.

The process circuit 4-1 executes necessary processes (for example, gamma process, white balance process, color difference matrix process, and the like) as a video image signal. After completion of the necessary signal processes as mentioned above, the signal generated from the process circuit 4-1 is supplied to one end of a change-over switch 4-6 and is also sent to a memory unit 4-3.

A signal which is generated from the memory unit 4-3 is given to the other end of the change-over switch 4-6 to which the output signal from the process circuit 4-1 is given. A neutral point of the switch 4-6 is connected to an encoder circuit 4-2. The signal selected by the switch 4-6 is supplied to the encoder circuit 4-2. The encoder circuit 4-2 converts the input signal into the video signal and generates the video signal.

On the other hand, the image pickup element 3-1 is driven through a buffer circuit 3-2 by a group of pulses (a pulse $\emptyset_H$ for H transfer, a pulse $\emptyset_V$ for V transfer, a reset pulse $\emptyset_R$, a transfer gate pulse $\emptyset_T$, etc.) generated by a drive pulse generation circuit 3-3. The transfer gate pulse $\emptyset_T$ is supplied to the buffer circuit 3-2 through a gate circuit 3-4.

A signal from a synchronism (sync) signal generation circuit 4-4 is supplied to the drive pulse generation circuit 3-3, thereby matching the timing with sync signals (H and V field pulses) of the video.

The sync signal from the sync signal generation circuit 4-4 is also supplied to an accumulation signal generation circuit 4-5 to generate a signal for control of an accumulation time and to the memory unit 4-3. A control signal is also supplied to the accumulation signal generation circuit 4-5 from the camera control circuit 5 (or I/F control circuit 9). When the control signal is supplied to the accumulation signal generation circuit 4-5, the signal for the accumulation time control is generated on a vertical period V unit basis.

One of two output signals of the accumulation signal generation circuit 4-5 is supplied to a switching terminal of the change-over switch 4-6 and to the memory unit 4-3. When the signal is read out from the image pickup element 3-1, the change-over switch 4-6 is connected to the process circuit 4-1 side, thereby allowing a signal of the real time to be generated.

While the signal is being accumulated in the image pickup element 3-1, the switch 4-6 is connected to the memory unit 4-3 side, thereby outputting the image from the memory unit and interpolating.

The output of the accumulation signal generation circuit 4-5 is also supplied to the gate circuit 3-4 and a transfer gate pulse $Ø_T$ is controlled by a signal for the accumulating time control. The transfer gate pulse $Ø_T$ is a signal to read out the charges accumulated in a photoelectric converting section (for example, photodiode) in a CCD solid image pickup element and to transfer the charges to a CCD shift register for transfer (CCD shift register in the V direction).

Therefore, when the transfer gate pulse $Ø_T$ is not supplied, the charges which were photoelectrically converted into the electric signal are not read out but are held in a state in which they are accumulated in the photodiode, so that the accumulating time is long. In this instance, when there is a motion in the photographed image, its electric signal is averaged by the accumulating time, so that the high frequency component of the image decreases.

Figure 5:
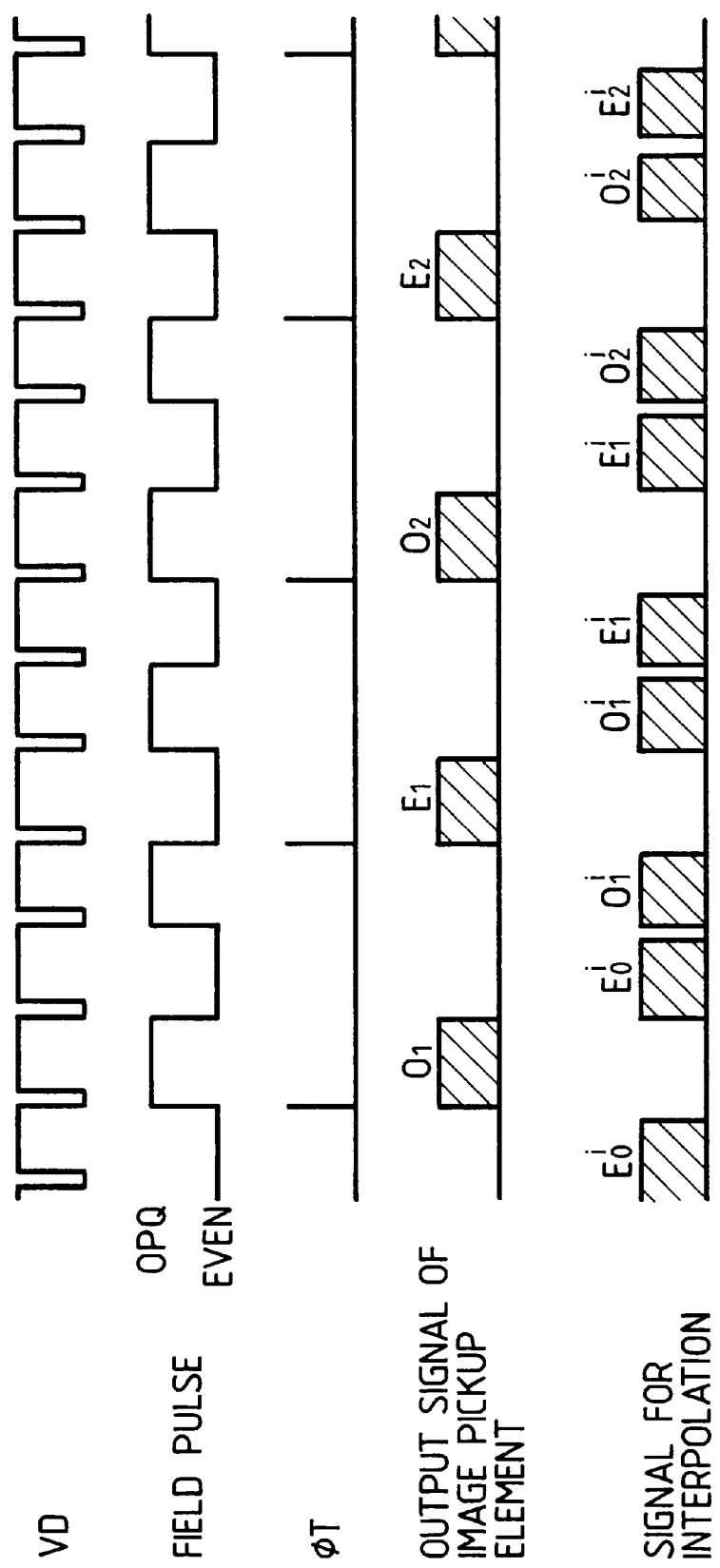
FIG. 5 is a schematic timing chart for explaining an example of the accumulation control operation according to the invention.

FIG. 5 shows an example of a schematic timing chart among the transfer gate pulse $Ø_T$ when the accumulating time is long, the output signal of the image pickup element 3-1, and the interpolation signal by the memory unit 4-3. As for the output signal of the image pickup element 3-1, the timing in the case where a sensor which operates in the field accumulating mode was used is shown.

In FIG. 5, a waveform shown at the top stage indicates a vertical sync pulse VD and a waveform shown at the second stage indicates a field pulse. The pulse waveform $Ø_T$ at the third stage indicates a pulse after it was gated by the gate circuit 3-4 and a pulse is generated every two other fields. Although the gate pulse $Ø_T$ is generated at every field in the ordinary operation, it is intermittently generated because the accumulating time control is executed in this case.

The field in which the gate pulse $Ø_T$ was generated is outputted as a video signal from the image pickup element 3-1 because the charges of the photodiode are sent to a CCD transfer line. Such a state is diagrammatically shown at the fourth stage. In the diagram, reference mark O denotes a signal of the ODD field and E denotes a signal of the EVEN field. Each of the reference numerals shown as suffixes indicates the order of the signal shown in the diagram.

In two fields after the ODD field signal $O_1$ was generated as mentioned above, since there is no gate pulse $Ø_T$, no signal is outputted. Therefore, a signal corresponding to those two fields is interpolated by the signals stored in the memory unit 4-3. Such a state is shown at the fifth stage.

In the diagram, $O^i$ denotes an interpolation signal for the ODD field and $E^i$ denotes an interpolation signal for the EVEN field. Each of the reference numerals as suffixes 1, 2, - - - written in the right lower positions indicates a memory output of the signal (signal which has previously been stored in the memory unit 4-3) of the same kind of field at the fourth stage in the diagram to which the same suffix was added.

By interpolating the signals as shown in FIG. 5, the accumulating time can be increased. Therefore, when an image plane moves for a long accumulating time, the images are averaged and an information amount can be reduced.

As another embodiment, there is also a method whereby the movement of the photographing position by the optical axis control device 18 is interlocked with the focusing and zoom states.

In case of the TV conference, for instance, when considering the case of photographing a few persons, the photographing position, focusing stage, and zoom state are determined for each person. Therefore, at the beginning of the conference, the focusing state and zoom state have previously been set into the I/F control circuit 9 by the remote operation in the initial setting in correspondence to each of the photographing positions.

In the subsequent operation, by presetting the I/F control circuit 9 so as to control the focusing and zoom states interlocking with the photographing position, only the information regarding the photographing position exists as control information from the outside and the focusing and zoom states are automatically properly adjusted, so that the photographing operation can be preferably executed.

A mechanism of the image input device, particularly, the optical axis control device of the embodiment will now be described with reference to FIGS. 6 to 8.

Figure 6:
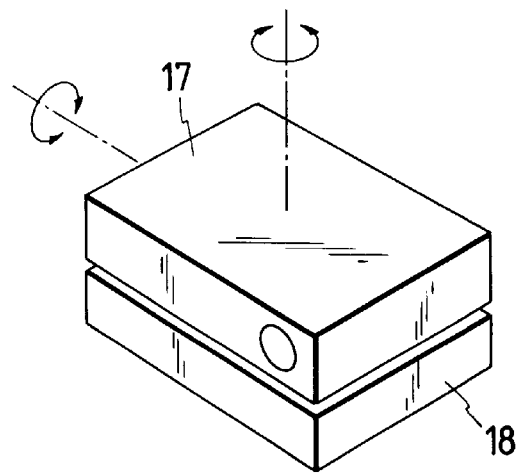
FIG. 6 is an external view of an embodiment of the invention.

FIG. 6 shows a schematic external view of the image input device of an embodiment of the invention. In FIG. 6, reference numeral 17 denotes a camera head having the image pickup device and the signal processing device. Reference numeral 18 indicates the optical axis control device which is constructed integratedly with the camera head 17 and is used to move the camera head 17 in the pan direction (horizontal direction) or in the tilt direction (vertical direction).

Figure 7:
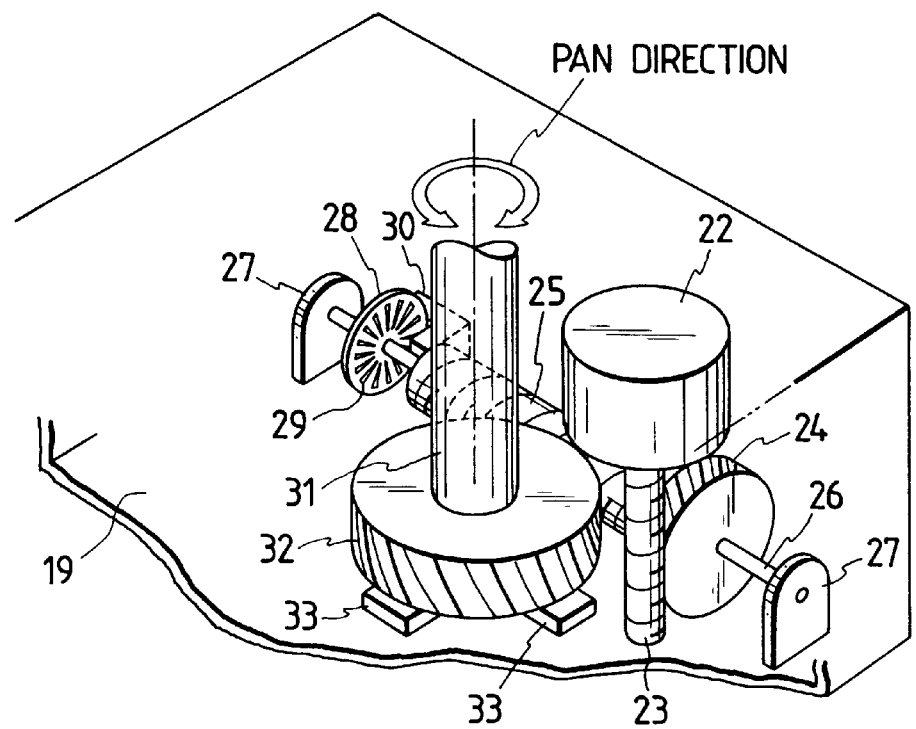
FIG. 7 is a diagram for explaining a drive mechanism in the horizontal direction in an embodiment of the invention.
Figure 8:
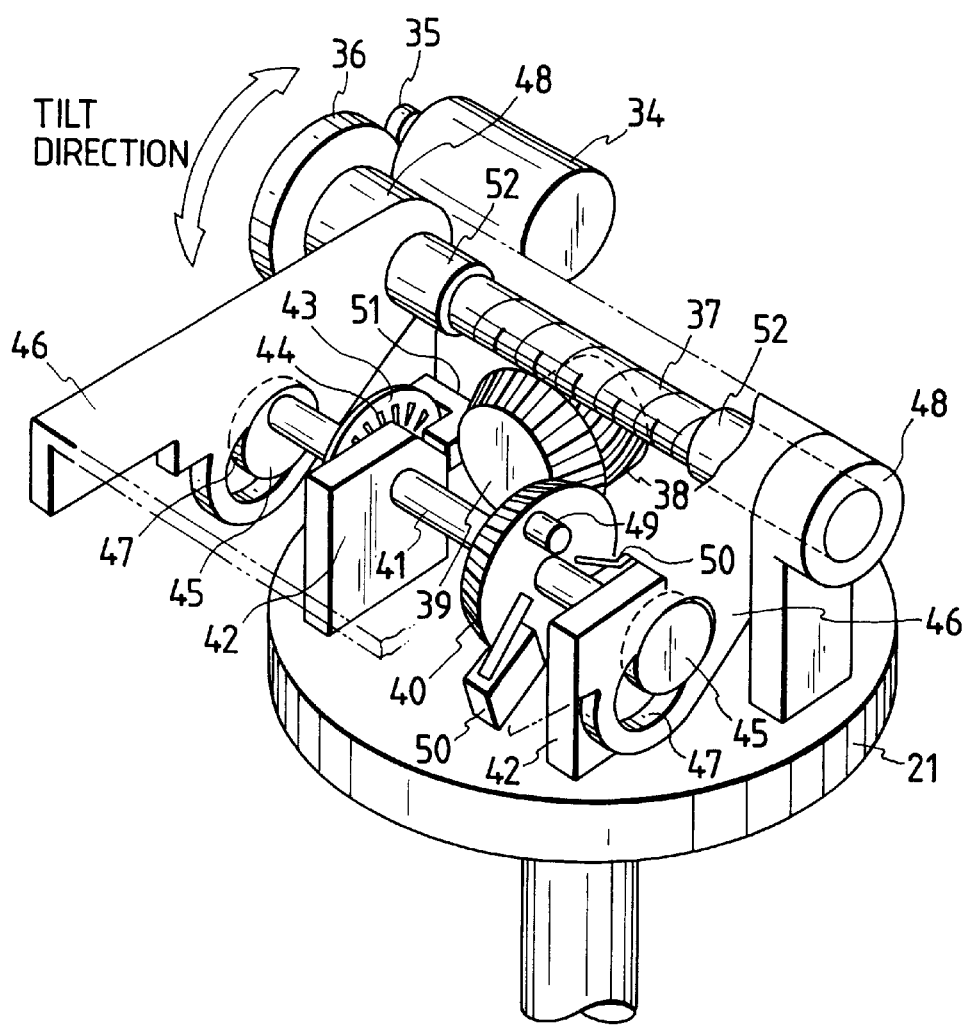
FIG. 8 is a diagram for explaining a drive mechanism in the vertical direction in an embodiment of the invention.

FIG. 7 shows an example of the optical axis control device 18 and, particularly, shows an outline of a mechanism to move the camera head 17 in the pan direction. FIG. 8 shows another example of the optical axis control device 18 and, particularly, shows an outline of a mechanism to move the camera head 17 in the tilt direction.

In FIG. 7, reference numeral 22 denotes a motor; 23 a worm gear inserted into a rotary shaft (not shown) of the motor 22 with a pressure; 24 a helical gear which is come into engagement with the worm gear 23; 25 a worm gear which rotates integratedly with the helical gear 24; and 26 a rotary shaft which rotates integratedly with the helical gear 24 and the worm gear 25.

The rotary shaft 26 is axially rotatably supported by two bearings 27. Reference numeral 28 denotes a disk which rotates integratedly with the shaft 26 and has a number of slits 29. Reference numeral 30 denotes a transmission type photointerrupter. In association with the rotation of the disk 28, the slit 29 allows the transmission light of the photointerrupter 30 to pass or shuts off the transmission light, thereby detecting its signal. A detection signal is sent to a counter (not shown).

Reference numeral 31 denotes a shaft which is rotatably axially supported by a base plate 19; and 32 indicates a helical gear which is come into engagement with the worm gear 25 and is constructed integratedly with the shaft 31. Two microswitches 33 are provided as shown in the diagram. When the helical gear 32 rotates in the pan direction as will be explained hereinlater, a cam pin (not shown) projected under the lower surface of the helical gear 32 makes the two microswitches 33 operative. Thus, the operation limit position in the pan direction of the camera head 17 (not shown) is detected. The initial position can be also set by the two microswitches 33.

In the above construction, when the motor 22 is driven in accordance with the control signal from the I/F control circuit 9 (refer to FIG. 1), the rotational force of the motor is sequentially transferred to the worm gear 23, helical gear 24, worm gear 25, and helical gear 32. Thus, the helical gear 32 is rotated integratedly with the shaft 31 axially supported by the base plate 19.

A tilt direction working table, which will be explained hereinlater, is fixed to the other edge of the shaft 31. In this instance, when the two microswitches 33 are made operative by a cam pin (not shown), the initial position and the operation limit position of the camera head 17 (not shown) can be known. Further, a rotational angle in the pan direction of the camera head 17 (not shown) can be known by the signal which is generated from the photointerrupter 30, so that the rotational angle in the pan direction of the camera head 17 (not shown) can be also controlled by such information.

The operation in the tilt direction will now be described with reference to FIG. 8. In FIG. 8, reference numeral 21 denotes a tilt direction working table coupled with the shaft 31 shown in FIG. 7; 46 a camera head fixing plate which is constructed integratedly with the camera head 17 (not shown); 34 a motor; 35 a spur gear inserted into a rotary shaft (not shown) of the motor 34; 36 a spur gear which is in engagement with the spur gear 35; and 37 a worm gear which rotates integratedly with the spur gear 36. Both edges of the worm gear 37 are rotatably axially supported by two bearing portions 48 provided over the tilt direction working table 21.

Reference numeral 38 denotes a helical gear which is come into engagement with the worm gear 37; 39 a bevel gear which rotates integratedly with the helical gear 38; and 40 a bevel gear which is come into engagement with the bevel gear 39. A cam pin 49 is projected on one side of the bevel gear 40. In association with the rotation of the bevel gear 40, the cam pin 49 makes two microswitches 50 arranged on both of the right and left sides of the front surface of the bevel gear 40 operative. Due to this, the initial position and the operation limit position of the operations in the tilt direction of the camera head 17 (not shown) can be known.

Reference numeral 41 denotes a shaft which rotates integratedly with the bevel gear 40; 42 a pair of bearings provided on the working table 21 in order to rotatably axially support the shaft 41; 43 a disk which rotates integratedly with the shaft 41 and has a number of slits 44; and 51 a transmission type photointerrupter. In association with the rotation of the disk 43, the slit 44 allows the transmission light of the photointerrupter 51 to pass or shuts off the transmission light, thereby detecting its signal. The detection signal is sent to a counter (not shown).

Reference numeral 45 denotes cams each having a long hole shape fixed to both edges of the shaft 41. The cam 45 is in engagement with a cam groove 47 formed on the camera head fixing plate 46. The camera head fixing plate 46 is rotatably axially supported by two shafts 52.

In the above construction, when the motor 34 is driven in accordance with a control signal from the I/F control circuit 9 (refer to FIG. 1), its rotational force is sequentially transferred to the spur gear 35, spur gear 36, worm gear 37, helical gear 38, bevel gear 39, bevel gear 40, shaft 41, and long hole shaped cam 45.

On the other hand, since the cam 45 is in engagement with the cam groove 47, the camera head fixing plate 46 moves in the tilt direction around the shaft portion 52 as a center together with the camera head 17 (not shown) by the rotating operation of the cam 45.

The initial position and the operation limit position of the camera head fixing plate 46, namely, the camera head 17 (not shown) can be known by two microswitches 50. Further, since the rotational angle in the tilt direction of the camera head 17 (not shown) by the signal generated from the photointerrupter 51, the rotational angle can be also controlled on the basis of such information.

By providing the foregoing optical axis control device 18 integratedly with the camera head 17, the camera head 17 can freely operate in the pan or tilt direction.

Although the mechanism of the embodiment has been described with respect to the camera head as a portion which is driven by the optical axis control device, the invention is not limited to such a case. For example, it is also possible to drive the lens and the image pickup device and to fix the signal processing circuit.

When there is no need to largely change the photographing range (position), the lens and the image pickup device can be also driven in consideration of the relative positional relation between them. Or, the optical axis of the incident light can be also changed. Specifically speaking, it is also possible to provide a variable apex angle prism to a position in front of the lens and to change the apex angle. Further, it is also possible to provide a parallel flat plate glass onto the optical path and to change an angle for the optical axis.

An initialization of the image input device of the embodiment will now be described hereinbelow.

Figure 9:
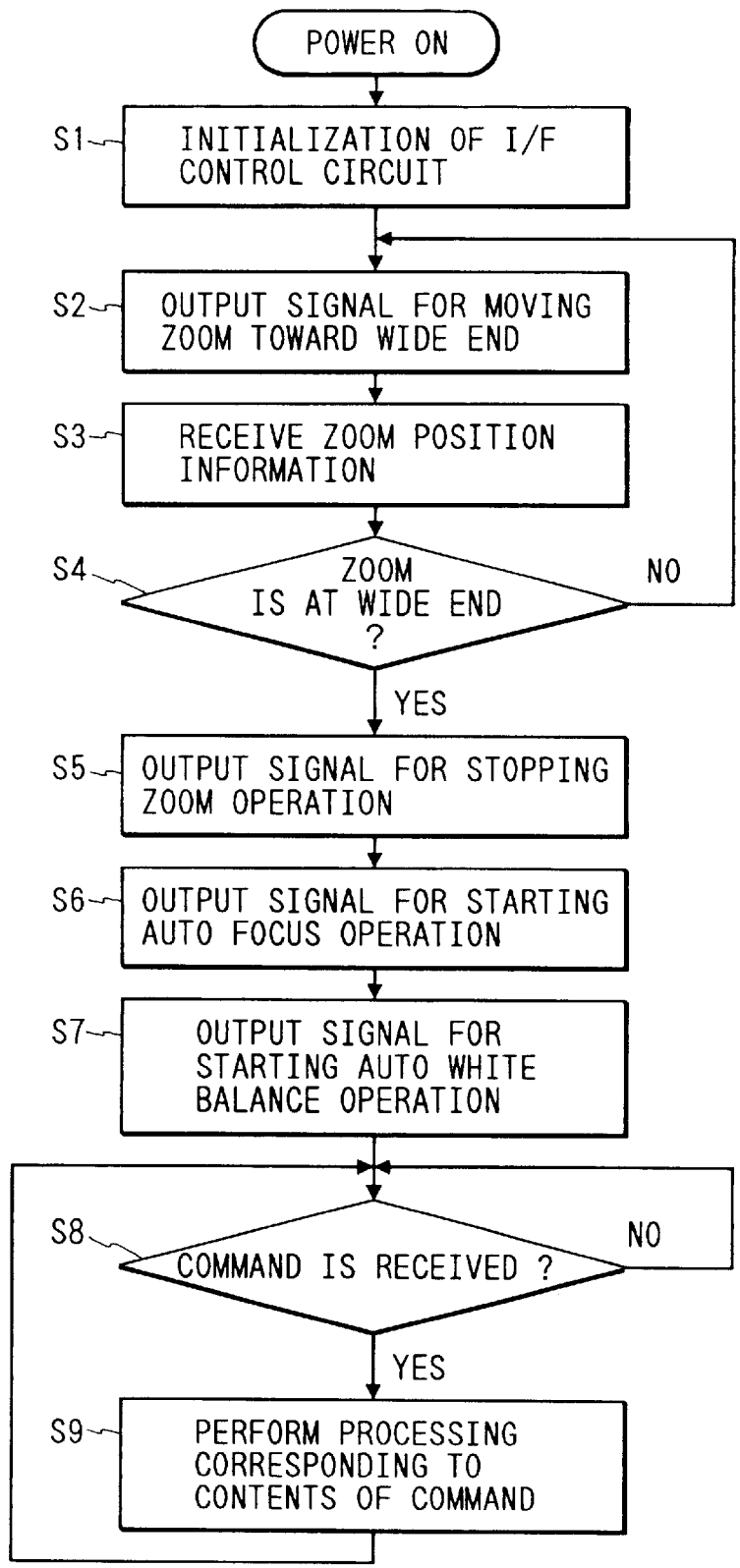
FIG. 9 is a schematic flowchart for explaining an embodiment of the invention.

The initialization of the camera system and the lens control system will be first described. FIG. 9 shows a schematic flow chart in this case.

In the diagram, processes shown in steps S2 to S7 relate to an example of the initialization step newly added.

When a power supply is turned on, in step S1, the I/F control circuit 9 is initialized and the function as a control circuit can operate. In step S2, a signal to move the zoom to the wide side is transmitted from the I/F control circuit 9 to the camera control circuit 5 and controls the zoom control circuit 8 from the camera control circuit 5, so that the zoom starts to move toward the wide side. At the same time, a signal indicative of the zoom position information is sent from the zoom control circuit 8 to the I/F control circuit 9 through the camera control circuit 5.

The I/F control circuit 9 receives such a signal (step S3) and evaluates (step S4). In the evaluation in step S4, when the zoom is not located at the zoom end, the processing routine is returned to step S2. When the zoom is located at the wide end, step S5 follows and a signal to stop the zoom operation is generated. A state setting of the zoom is finished.

Subsequently, in step S6, a signal to start the auto focusing operation is supplied from the I/F control circuit 9 to the camera control circuit 5, thereby starting the auto focusing mode. In step S7, a signal to start the auto white balance adjusting operation is similarly sent to the camera control circuit 5, thereby starting the auto white balance mode. The auto white balance mode is, for example, a well-known auto tracking auto white balance mode.

In step S8 and subsequent steps, the conventional functions of the I/F control circuit 9 are executed. That is, a check is made in step S8 to see if a control signal (command) has been inputted from the outside or not. The apparatus waits for the input of a command. When a control signal is supplied from the outside, the process according to the control signal is executed in step S9. After that, the apparatus again waits for the input of a command.

By constructing the initializing procedure as mentioned above, after the turn-on of the power source, the zoom lens is set to the wide end and a just in-focus state is obtained by the auto focusing operation. Further, a good color balance state is obtained by the auto white operation. Therefore, a whole region of the photographed image can be grasped at a glance and the operator can subsequently extremely easily operate the apparatus.

A state setting to initialize only the optical axis control system will now be described. According to the foregoing initialization procedure of the camera system and the lens control system, by enabling the photographed image to be easily seen, the following operation can be easily executed. Particularly, such a procedure is useful means for the operator (for example, operator in a personal TV conference or the like; not a communication partner).

In case of remote controlling the image input device on the partner side under a state in which the circumferential environment of the communication partner of a personal TV conference or the like is unknown, there occurs a situation such that even when the whole portion of the photographed image is seen, so long as the operator doesn't recognize the partner with whom the operator is communicating at present, a position at which the optical axis of the field of view of the image pickup operation should be located is unknown. Therefore, it is troublesome to match the optical axis of the field of view to that of the communication partner, so that the apparatus is difficult to use.

Figure 10:
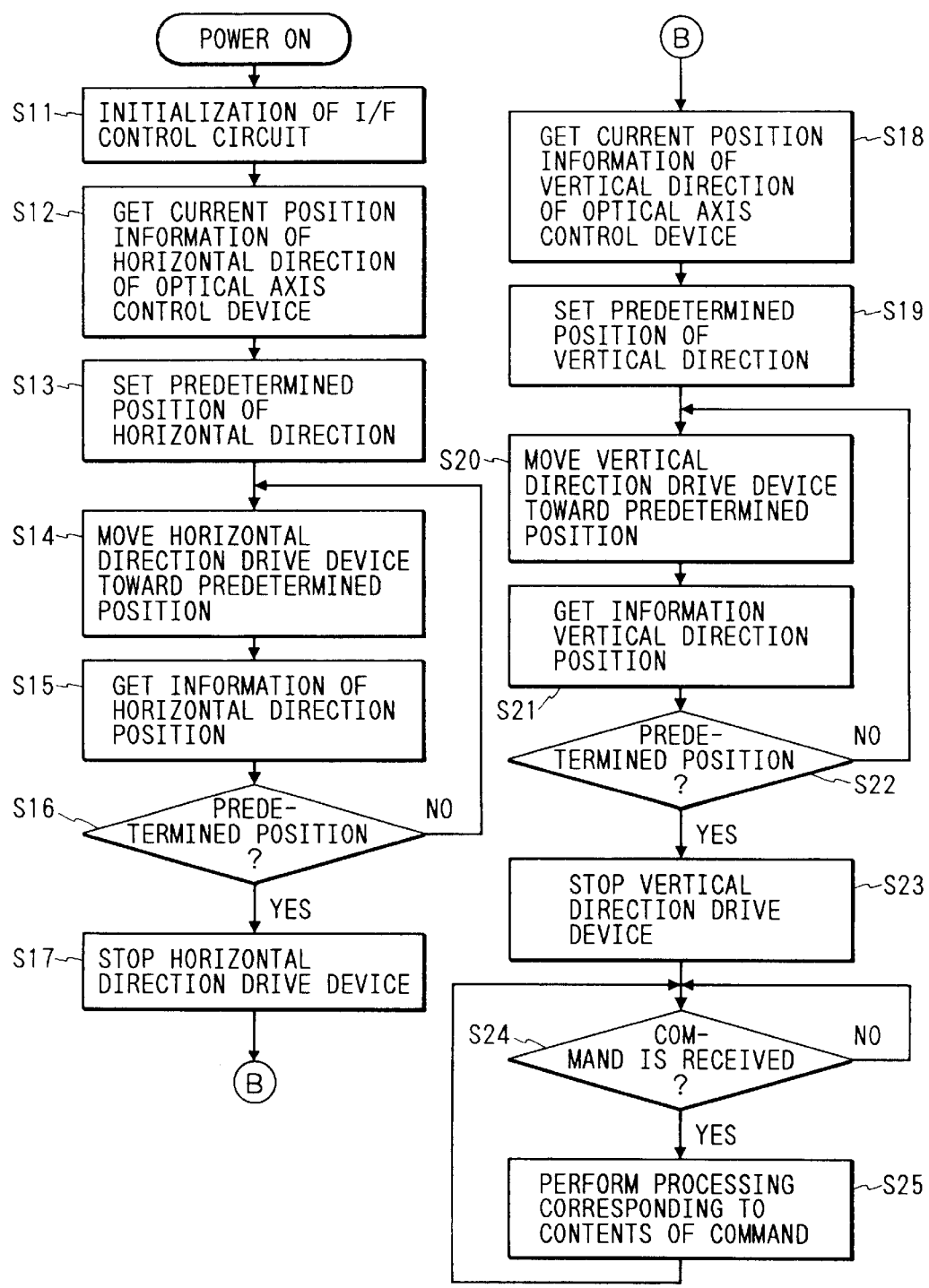
FIG. 10 is a schematic flowchart for explaining another embodiment of the invention.

Therefore, by automatically setting the optical axis control system into a predetermined direction (ordinarily, front position at which a probability such that the communication partner is located is high) by the initialization, for example, it is possible to immediately recognize that a person who was photographed at the front position of the field of view is a communication partner. FIG. 10 shows a schematic flowchart of an embodiment for initialization of the optical axis control system in this case. As shown in FIG. 10, when the power source is turned on, the I/F control circuit 9 is initialized in step S11 and the function as an I/F control circuit 9 can operate.

Subsequently, a procedure to obtain the current position information in the horizontal direction of the optical axis control device 18 in step S12 is executed. A procedure to set the position (for instance, the center of the movable range) in the horizontal direction to be set is executed in step S13. After that, the drive device in the horizontal direction is moved toward a predetermined position in step S14. Further, information regarding the position at that time is obtained in step S15. A check is made to see if the horizontal direction drive device has reached the predetermined position or not in step S16. If NO in step S16, the processing routine is again returned to step S14.

When the drive device has reached the predetermined position in step S16, the horizontal direction drive device is stopped in step S17. The initialization in the horizontal direction of the optical axis control device 18 is finished. In steps S18 to S23, the initialization in the vertical direction of the optical axis control device 18 is similarly finished, the initialization in both of the horizontal and vertical directions is finished, and the initialization of the optical axis control device 18 is finished. After that, the processing routine advances to the conventional processing steps S24 to S25. Since the processes in steps S24 and S25 are similar to those in steps S8 and S9 already described in FIG. 9, their descriptions are omitted.

By the initialization of the optical axis control device 18 as mentioned above, after the turn-on of the power source, the positions in the horizontal and vertical directions of the optical axis control device 18 are automatically set to predetermined positions (for example, the center positions of the movable ranges in the horizontal and vertical directions). Therefore, after completion of the above initialization, since the direction of the optical axis is clear, the next operator can fairly easily operate the apparatus and such means is very useful.

Although the contents of the initialization in FIGS. 9 and 10 have been described as if they were different, it will be understood that those initialization processes can be also set to the initialization by a series of procedures. For example, the zoom position is set to the wide end by the series of procedures in steps S1 to S7 in FIG. 9, the auto focusing operation is started, and the auto white balance operation is started. Subsequently, the optical axis control device 18 is set to a predetermined position by the procedures in steps S12 to S23 in FIG. 10. Or, the optical axis control apparatus 18 is set to a predetermined position by the series of procedures in steps S11 to S23 in FIG. 10. Subsequently, the zoom position is set to the wide end and the auto focusing operation and auto white balance operations are set by the series of procedures in steps S2 to S7 in FIG. 9.

After completion of the initialization by the series of procedures as mentioned above, the whole portion of the image which was picked up can be seen at a glance and the optical axis of the field of view of the image picked up is directed toward a predetermined direction (for example, front side). Therefore, it is very useful for the operator and a large effect is derived.

In case of the above example, each of the devices to be controlled has been initialized after the turn-on of the power source. However, it is not always necessary to initialize them after the power-on. For example, it is also possible to construct in a manner such that the series of initialization processes of the devices to be controlled as mentioned above have been preset so that they can be executed by one control command and by inputting the control command from the control signal from the outside to the I/F control circuit 9, the device to be controlled is initialized at an arbitrary time. In this case, by merely inputting the above one control command from the outside just after the power-on, an effect similar to that mentioned above can be obtained without sending all of the control commands to various devices to be controlled.

There is another advantage such that during the operation of the image input device of the embodiment, an operating state can immediately be set into a predetermined state irrespective of any state of the image input device, so that a remarkably large effect is derived. The set states mentioned above are not fixed states. For example, the set state in the initialization for the optical axis control device is not limited to, for example, only the center of the movable range. Namely, since the image input device has a small construction, when it is used as an image input device for a computer, there is a case where it is put on a monitor.

In this instance, it is necessary that the optical axis of the field of view in the vertical direction is slightly downwardly directed and is not located at the center. Particularly, in case of setting the optical axis into a state other than the "center" as in the above example, such a state can be easily realized by providing a "memory unit" into the I/F control circuit 9.

The more detailed contents of the above initialization will now be described hereinbelow.

The following description relates to an embodiment of the initialization of the optical axis control device. Particularly, it relates to one specific example regarding the case where a series of initialization processes can be executed by one control command. A case of using stepping motors as power sources for driving the horizontal and vertical direction control devices in the optical axis control device will now be described.

In the image input device of the embodiment of the invention, upon initialization after the power-on, a predetermined fixed absolute position is detected and the optical axis direction is recognized, thereby enabling the direction of the optical axis at the time of turn-on of the power source to be recognized. During the operation, the position information of the optical axis control device is stored into a position memory and the contents in the position memory are rewritten every operation, thereby always recognizing the current position. When a fixed point in a certain movable range is detected, by correcting the position information, the more accurate position control of the optical axis can be executed.

Another embodiment of the image input device of the invention will now be described hereinbelow with reference to FIGS. 11 to 14.

Figure 11:
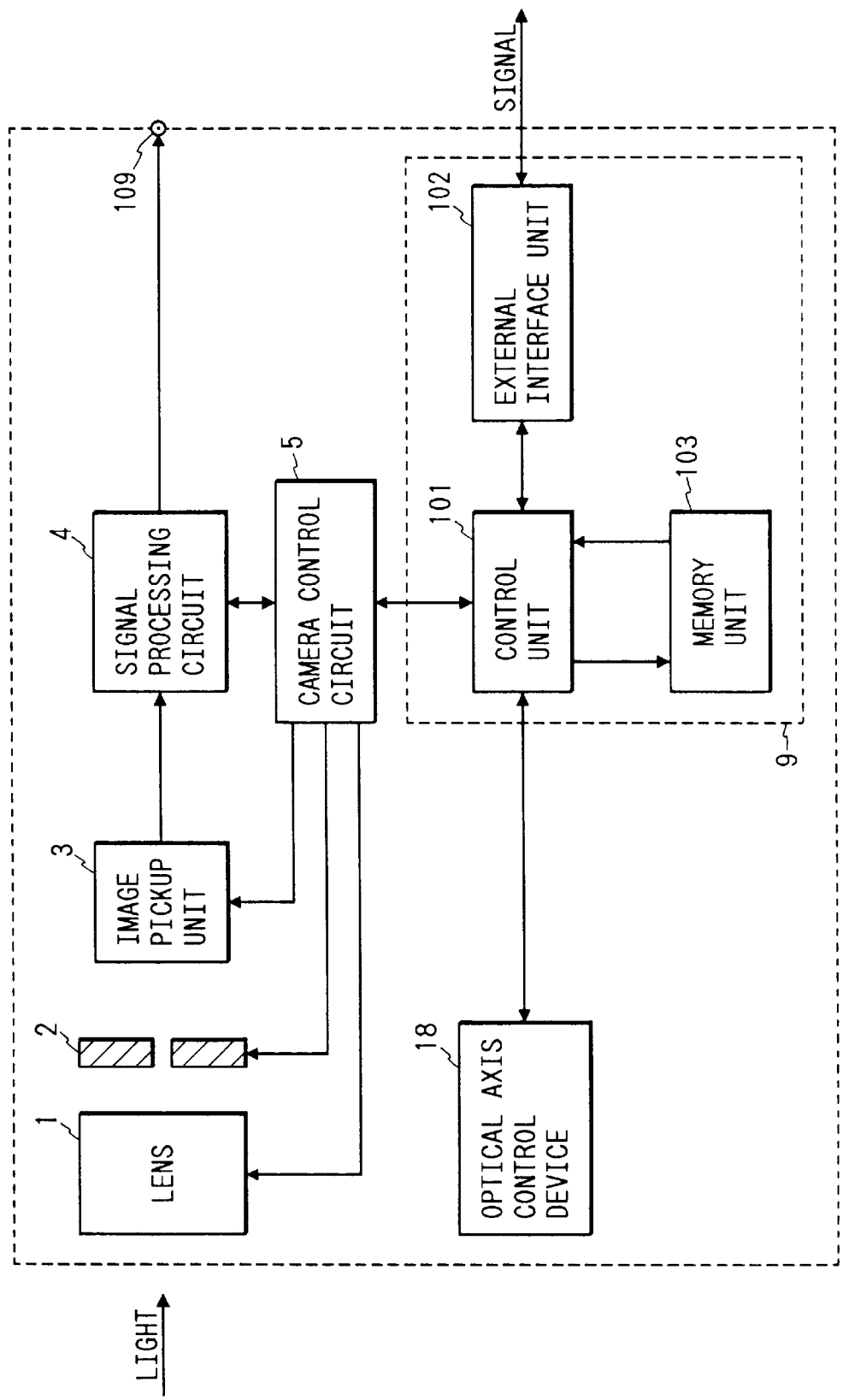
FIG. 11 is a schematic block diagram for explaining another embodiment of the invention.

FIG. 11 is a schematic block diagram of the image input device according to another embodiment. In FIG. 11, the portions corresponding to those in FIG. 1 are designated by the same reference numerals and their descriptions are omitted here.

The I/F control circuit 9 is constructed by a control unit 101, an external interface unit 102, and a memory unit 103.

In FIG. 11, the control unit 101 controls the camera control circuit 5, thereby controlling the lens 1, iris device 2, image pickup device 3, signal processing circuit 4, and optical axis control device 18. The external interface unit 102 receives commands from an external control device. In the embodiment, the external interface unit 102 receives all of the commands from an external host computer by a serial communication.

The memory unit 103 is used to temporarily store various kinds of data such as position information in the horizontal and vertical directions, operating frequency information in the optical axis control device 18, and the like. The optical axis control device 18 is constructed by a mechanical mechanism for changing the optical axis and stepping motors (refer to FIGS. 7 and 8) for mainly executing the operations in the horizontal and vertical directions. All of the driving, stop, management of the operating frequencies, and the like of the stepping motors are executed by the control unit 101.

The device includes a switching mechanism to detect the operation limits in the horizontal and vertical directions. Switching information by the switch can be monitored by the control unit 101. The control of the focus, zoom, iris device 2, and image pickup device 3 included in the lens unit 1 is performed by controlling the camera control circuit 5 by the control unit 101.

An operation flow of the image input device of FIG. 11 will now be described.

Figure 12:
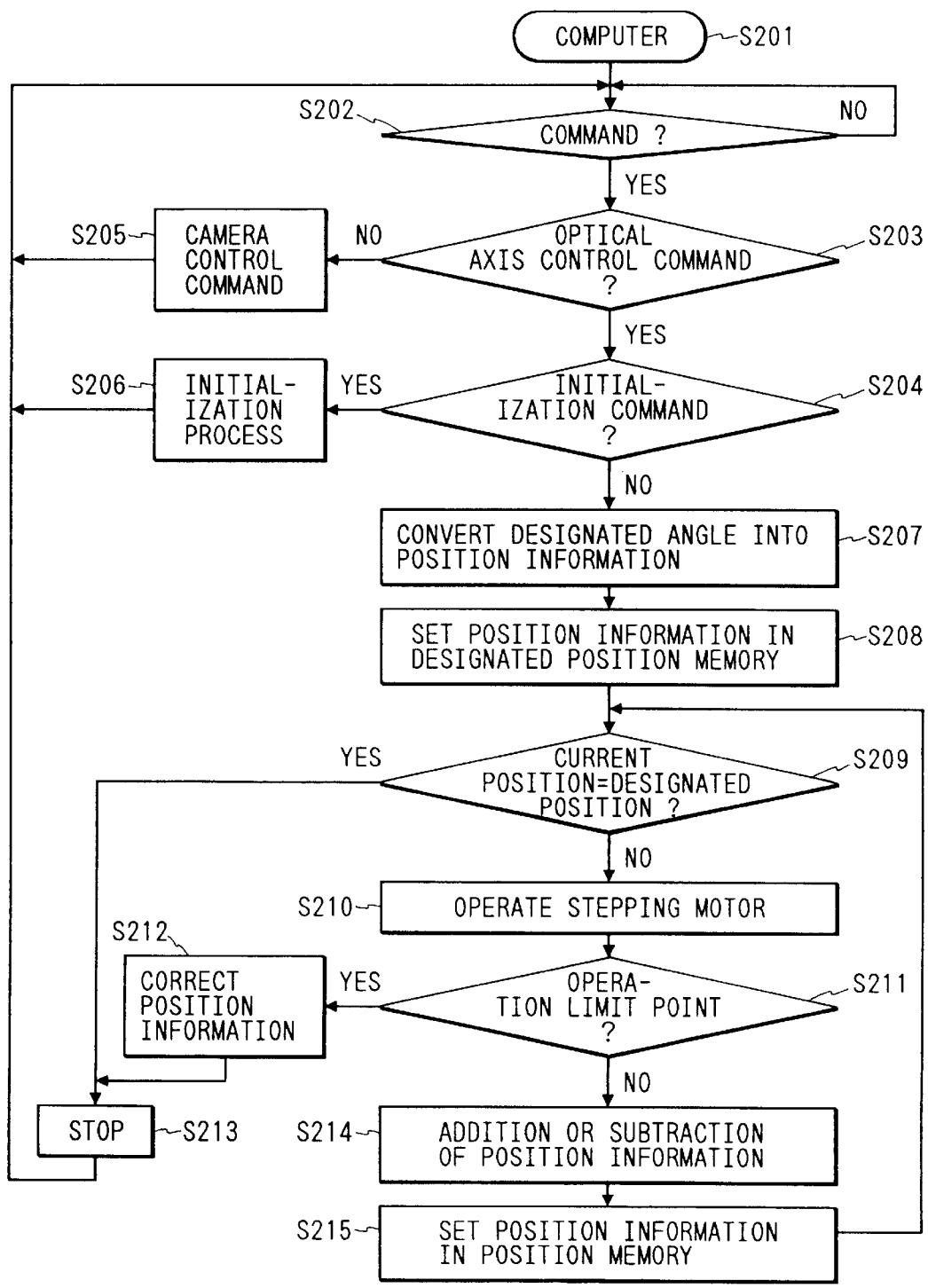
FIG. 12 is a schematic flowchart for explaining the operation of an image input apparatus in FIG. 11.
Figure 13:
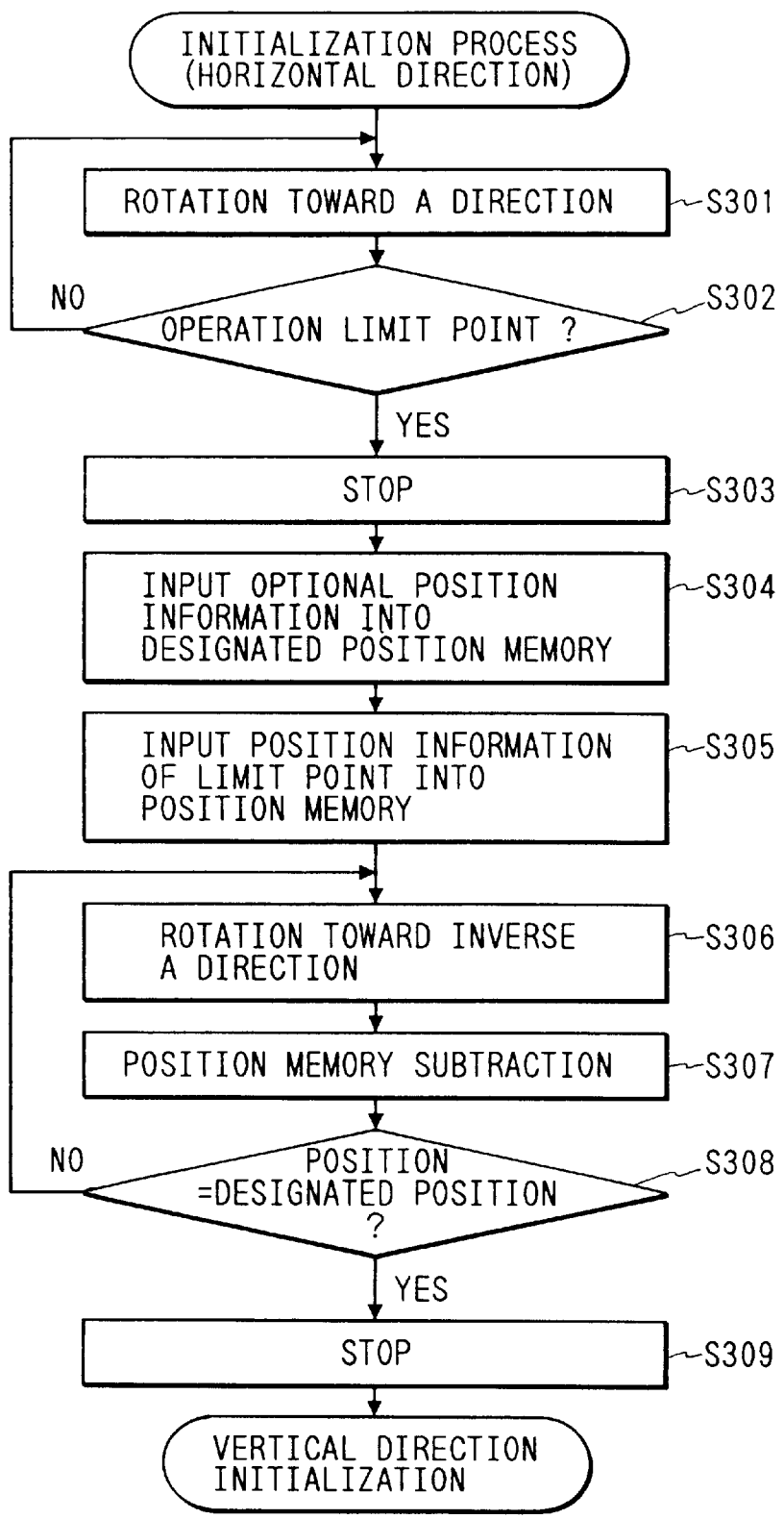
FIG. 13 is a schematic flowchart for explaining the operation of the image input apparatus in FIG. 11.
Figure 14:
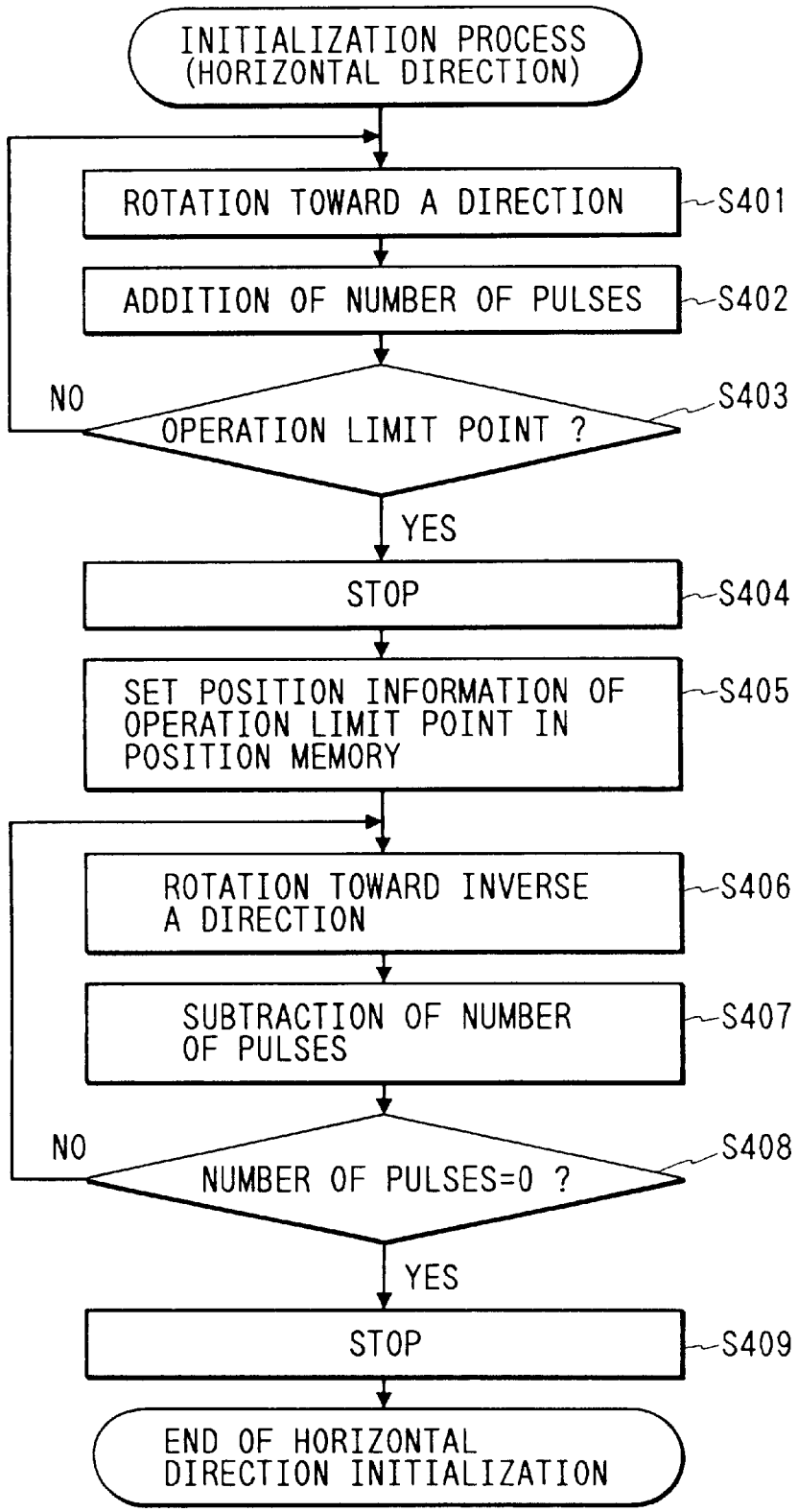
FIG. 14 is a schematic flowchart for explaining the operation of the image input apparatus in FIG. 11.

FIG. 12 is a flowchart of an embodiment according to the image input device of FIG. 11. FIGS. 13 and 14 are flowcharts for the initialization process in FIG. 12.

In FIG. 12, a control command is sent from a computer to the image input device in step S201 through an interface such as RS232C or the like. In step S202, a check is made to see if the control command has been received or not. When the command is received, step S203 follows. In step S203, a check is made to see if the received command is an optical axis control command or not. If YES, step S204 follows and a check is made to see if the received command is a command to initialize the optical axis control device or not. When the received command is not the optical axis control command in step S203, step S205 follows. In the embodiment, the control operation of the camera is executed in step S205. Practically speaking, the zooming, focusing, white balance, iris, and the like are adjusted. In step S204, in case of the initialization command, step S206 follows and the initialization process is executed as will be explained hereinlater. When the received command is not the initialization command, step S207 follows and the following operation control of the optical axis is executed.

In step S207, the designated absolute angle is converted into the position information. In step S208, the position information of the designated angle is stored into a designated position memory in the memory unit 103. In step S209, the number of pulses indicative of the position information stored in the designated position memory and the number of pulses indicative of the current position information stored in the position memory are compared. When they are equal, it is regarded that the current position has reached the designated position, and the operation of the optical axis (operation of the stepping motor) is stopped (step S213). The processing routine is returned to step S202.

When the current position is not the designated position in step S209, step S210 follows, thereby making the stepping motor operative. In step S211, a check is made to see if the optical axis has reached the operation limit point or not. If YES, the data of the current position is corrected to the position indicative of the limit point (step S212). If NO, in step S214, the number of pulses indicative of the current position stored in the position information memory is increased or decreased in accordance with the operation amount. In step S215, the position information is stored into the position memory. The processing routine is returned to step S209.

The initialization process in step S206 shown in FIG. 12 will now be specifically explained with reference to FIG. 13.

The initialization will be first performed in the horizontal direction. In step S301, the stepping motor is made operative so that the optical axis control device rotates in an arbitrary A direction. In step S302, the operation in step S301 is continued until the operation limit point is detected. When the operation limit point is detected, the operation of the stepping motor is stopped (step S303). After that, in step S304, arbitrary position information (for example, information corresponding to the center of the variable range) is supplied into the horizontal direction designated position memory in the memory unit 103. In step S305, the position information corresponding to the operation limit point is set into the horizontal direction position memory. After that, in step S306, the optical axis control device is made operative in the direction opposite to the above A direction. In step S307, the value in the horizontal position memory is decreased in accordance with the operation amount of the stepping motor.

In step S308, at a time point when the value in the horizontal position memory is equal to the value stored in the horizontal direction designated position memory, the operation in the horizontal direction is stopped (step S309). The initialization process in the vertical direction is executed. When they are different in step S308, the processing routine is returned to step S306 and the operation to move the optical axis control device in the direction opposite to the A direction is continued.

The initialization process in the vertical direction will now be executed in a manner similar to the case in the horizontal direction. That is, the optical axis control device is operated in the vertical direction and the operation is continued until the operation limit point is detected and the device stops. When the operation limit signal is detected, arbitrary position information (for example, information corresponding to the center of the movable range) is supplied to the vertical direction designated position memory. The position information corresponding to the operation limit point is stored and the optical axis control device is operated in the opposite direction.

The value in the vertical direction position memory is decreased in accordance with the operation amount of the stepping motor. At a time point when the value of the vertical direction position memory is equal to the value in the vertical direction designated position memory, the operation to move the optical axis control device in the vertical direction is stopped. Due to this, the initialization process is finished. By the initialization process, the absolute position of the optical axis control device can be recognized and the optical axis direction can be set to an arbitrary direction (for example, center of the movable range).

An example of another initialization process will now be described with reference to a flowchart shown in FIG. 14.

The initialization is first executed in the horizontal direction. In step S401, the stepping motor is operated so that the optical axis control device rotates in an arbitrary A direction. At the same time, the number of pulses according to the operation amount is added in step S402. Until the operation limit point is detected in step S403, the operations in steps S401 and S402 are continued. When the operation limit point is detected, the operation of the stepping motor is stopped (step S404). After that, in step S405, the position information corresponding to the operation limit point is set into the horizontal direction position memory in the memory unit 103. In step S406, the optical axis control device is operated in the direction opposite to the A direction. In step S407, the value of the number of pulses is decreased each time the stepping motor operates by one step.

In step S408, a check is made to see if the number of pulses is equal to zero or not. When it is equal to zero, the operation is stopped (step S409). The initialization process in the vertical direction is executed. When the number of pulses is not equal to 0, the processing routine is returned to step S406 and the operation is continued in the direction opposite to the A direction. The initialization process in the vertical direction is also executed in a manner similar to the initialization process in the horizontal direction. By the initialization processes, the optical axis direction can be set in the direction before initialization.

In the control of the optical axis control device after completion of the initialization, whenever the operation of the optical axis control device is executed, the position information indicative of the current position stored in the position memory is calculated in the position information adding/subtracting step S214, and the absolute position of the optical axis is independently stored into the horizontal direction position memory and vertical direction position memory. When the operator executes the position designating control, the position information of the designated position is supplied into the designated position memory. The value in the horizontal or vertical direction position memory is compared with the value in the designated position memory in a position information comparing step S308. The operation in the horizontal direction and the operation in the vertical direction are executed until the position information in the position memory and the designated position information are equal.

When the operation limit point is detected during each of the operations, the position memory to correct the position information is reset into the horizontal direction position memory or vertical direction position memory in step S212 and the position information indicative of the absolute position of the limit point is written into the position memory, thereby preventing that the error due to the calculations or the like increases.

Although the above embodiment has been shown and described with respect to the example in which the switching mechanism is attached to the operation limit point, the switching mechanism can be applied to any of the contact type and the contactless type. Further, even when the switching mechanism of the number which is less than or larger than that shown in the diagram are provided, the control method of the invention can be applied.

In the above embodiment, the initialization has been performed by the command. However, the above initialization can be also automatically executed when the power source is turned on. The position (optical axis direction) of the optical axis control device after completion of the initialization can be also freely set to an arbitrary position in the movable range. Even in case of performing the subsequent designated position control as well, by merely designating the absolute position in the movable range, the control can be executed. The order of the initialization processes in the horizontal and vertical directions can be also reversed.

Although the above embodiment has been shown and described with respect to the example in which the stepping motors have been used to drive the optical axis control device, it will be obviously understood that even when another drive device is used, an apparatus such that clear points of the absolute position or relative position are detected and the position is recognized can be also applied to the invention.

According to the embodiment as mentioned above, even when the optical axis position is unknown at the time of turn-on of the power source, the position of the optical axis control device can be recognized (optical axis direction is recognized). There is also an effect such that the more accurate position control can be executed by correcting the position during the operation.

According to the above embodiment, the number of systems to input the control signal from the outside can be set to one and the operation is simplified. By interlocking the control of the optical axis control device with another control, an information amount of the image can be reduced as necessary and a good image can be obtained by using the TV conference or the like.

Further, by integrating the optical axis control device and the lens and camera unit, a whole construction can be formed in a compact size, so that the apparatus can be put on a work station or personal computer. Due to this, for example, a personal TV conference system can be simply constructed.

According to another feature of the embodiment, since other devices in the image input device have been initialized by the I/F control circuit, the whole initialization can be concentratedly executed at the time of turn-on of the power source or by one control command from the outside. The use efficiency can be improved. Particularly, upon initialization, the zoom is set to the wide end, the focus is set into the auto focusing operating mode, the white balance is set into the auto white balance state, and the optical axis control device is set to the center position in the movable range, so that the use efficiency can be remarkably improved.

The invention can be embodied by other various forms without departing from the spirit and essential features of the invention.

In other words, the foregoing description of the embodiments has been given for illustrative purposes only and not to be construed as imposing any limitation in every respect.

The scope of the invention is, therefore, to be determined solely by the following claims and not limited by the text of the specification and alterations made within a scope equivalent to the scope of the claims fallen within the true spirit and scope of the invention.

What is claimed is:

1. An image input device comprising:
a) image pickup means for picking up an object image to generate an image signal, said image pickup means including an image pickup element for converting an optical image into an electric signal;
b) optical axis control means for enabling an optical axis of said image pickup means to be moved; and
c) control means for interlocking controlling said optical axis control means and generation of said image signal by said image pickup means, said control means also for controlling a charge accumulating time of said image pickup element and said optical axis control means.

2. A device according to claim 1, wherein said control means controls said image pickup element so as to set longer charge accumulating time when said optical axis control means operates than when said optical axis control means is inoperative.

3. An image input device comprising:
a) image pickup means for picking up an object image to generate an image signal;
b) image pickup control means for controlling said image pickup means, said image pickup control means for controlling an operative timing of automatic white balancing on said image signal which is generated from said image pickup means to form a video signal;
c) optical axis control means for enabling an optical axis of said image pickup means to be moved; and
d) control means for controlling interlock of a control operation of said optical axis control means and the operative timing controlled by said image pickup control means.

4. A device according to claim 3, further having input means for inputting a control signal from an external device, and wherein said control means operates in accordance with the control signal inputted by said input means.

5. An image input device comprising:
a) image pickup means for picking up an object image to generate an image signal;
b) signal processing means for executing automatic white balancing on said image signal which is generated from said image pickup means to form a video signal;
c) optical axis control means for enabling an optical axis of said image pickup means to be moved; and
d) control means for interlocking controlling said optical axis control means and the automatic white balancing of said signal processing means, wherein said control control means and said optical axis control means,
wherein said control means initializes the interlock so as to set said zoom means into an initial state in which said zoom means is located at a wide end.

6. An image input device comprising:
a) image pickup means for picking up an object image, said image pickup means including
image pickup control means for controlling an operative timing of focus adjusting means for adjusting the object image to be picked up into an in-focus state, zoom means for enlarging the object image to be picked up and signal processing means for executing a predetermined signal process on an image signal which is generated from said image pickup means;
b) optical axis control means for enabling an optical axis of said image pickup means to be moved; and
c) control means for controlling interlock of operations of said image pickup control means, and said optical axis control means,
wherein said control means initializes the interlock so as to set a zoom state into an initial state in which said zoom means is located at a wide end and to set a focus state into the in-focus state.

7. An image input device comprising:
image pickup means for converting an object image into an electrical signal;
image pickup control means for controlling an operative timing of a signal processing for converting an optical signal into the electrical signal, of said image pickup means;
optical axis control means for enabling an optical axis of said image pickup means to be moved; and
control means for controlling interlock of a control operation of said optical axis control means and an operation of said image pickup control means;
further comprising signal processing means for executing a predetermined signal process to the electrical signal which is generated from said image pickup means, and wherein said control means also interlockingly controls said processing means;
wherein said predetermined signal process is a process to adjust a white balance of said electrical signal; and
wherein said control means inhibits the white balance adjusting operation during the operation of said optical axis control means.

8. An image input method comprising:
a) an image means to generate an image signal, said image pickup means including an image pickup element for converting an optical image into an electric signal;
b) an optical axis control step of enabling an optical axis of said image pickup means to be moved; and
c) a control step of interlocking controlling said optical axis control step and generation of said image signal in said image pickup step, said control step also of controlling a charge accumulating time of said image pickup element and said optical axis control step.

9. An image input method comprising:
a) an image pickup step of picking up an object image by image pickup means to generate an image signal;
b) an image pickup control step of controlling said image pickup means, said image pickup control step of controlling an operative time of automatic white balancing on said image signal which is generated from said image pickup means to form a video signal;
c) an optical axis control step of enabling an optical axis of said image pickup means to be moved; and
d) a control step of controlling interlock of a control operation in said optical axis control step and operative timing controlled in said image pickup control step.

10. An image input method comprising:
a) an image pickup step of picking up an object image by image pickup means to generate an image signal;
b) a signal processing step of executing automatic white balancing on said image signal which is generated from said image pickup means to form a video signal;
c) An optical axis control step of enabling an optical axis of said image pickup means to be moved; and d) a control step of interlocking controlling said optical axis control step and the automatic white balancing in said signal processing step, wherein said control step inhibits the automatic white balancing during the operation in said optical axis control step.

11. An image input method comprising:
a) an image pickup step of picking up an object image pickup means to generate an image signal, said image pickup means including zoom means for enlarging the object image to be picked up;
b) an image pickup control step of controlling said image pickup means, said image pickup control step including a step of controlling an operative timing of a predetermined signal process on said image signal which is generated from said image pickup means;
c) an optical axis control step of enabling an optical axis of said image pickup means to be moved; and
d) a control step of controlling interlock of operations in said image pickup control step and said optical axis control step,
wherein said control step initializes the interlock so as to set said zoom means into an initial state in which said zoom means is located at a wide end.

12. An image input method comprising:
a) an image pickup step of picking up an object image by image pickup means;
b) an optical axis control step of enabling an optical axis of said image pickup means to be moved;
c) a first detecting step of detecting a current position of said optical axis moved in said optical axis control step;
d) a second detecting step of physically detecting only an original position of said optical axis in the optical axis control as the current position of said optical axis moved in said optical axis control step; and
e) a control step of controlling the position of the optical axis of said image pickup means in accordance with outputs of said first detecting step and said second detecting step.

13. An image input method comprising:
a) an image pickup step of picking up an object image by image pickup means, said image pickup means including
an image pickup control means for controlling an operative timing of focus adjusting means for adjusting the object image to be picked up into an in-focus state, zoom means for enlarging the object image to be picked up and signal processing means for executing a predetermined signal process on an image signal which is generated from said image pickup means;
b) an optical axis control step of enabling an optical axis of said image pickup means to be moved; and
c) a control step of controlling interlock of operations of said image pickup control means, and said optical axis controls step,
wherein said control step initializes the interlock so as to set a zoom state into an initial state in which said zoom means is located at a wide end and to set a focus state into the in-focus state.

14. An image input method comprising:
an image pickup step of converting an object image into an electrical signal by using image pickup means;
an image pickup control step of controlling an operative timing of a signal processing for converting an optical signal into the electrical signal, in said image pickup step;
an optical axis control step of enabling an optical axis of said image pickup means to be moved; and
a control step of controlling interlock of a control operation in said optical axis control step and an operation in said image pickup control step;
further comprising a signal processing step of executing a predetermined signal process to the electrical signal which is generated in said image pickup step, and wherein said control step also interlockingly controls said processing step;
wherein said predetermined signal process is a process to adjust a white balance of said electrical signal; and
wherein said control step inhibits the white balance adjusting operation during the operation in said optical axis control step.

15. An image input device comprising:
a) image pickup means for picking up an object image to generate an image signal, said image pickup means including zoom means for enlarging the object image to be picked up;
b) image pickup control means for controlling said image pickup means, said image pickup control means controlling an operative timing of a predetermined signal process on said image signal which is generated from said image pickup means;
c) optical axis control means for enabling an optical axis of said image pickup means to be moved; and
d) control means for controlling interlock of operations of said image pickup control means and said optical axis control means,
wherein said control means initializes the interlock so as to set said zoom means into an initial state in which said zoom means is located at a wide end.

16. A device according to claim 15, wherein said control means is also operative to set said image pickup control means into an initial state.

17. A device according to claim 16, wherein said image pickup control means includes white balance adjusting means for adjusting the white balance of the image signal which is generated from said image pickup means and wherein said image pickup control means operates said white balance adjusting means.

18. A device according to claim 15, comprising input means for inputting a control signal from an external device, and wherein said initialization of said image input device is executed when said input means inputs a signal to instruct the execution of the initialization from said external device.

19. A device according to claim 18, wherein said image pickup means includes focus adjusting means for adjusting the object image to be picked up into an in-focus state,
and said control means controls said image pickup means to operate said focus adjusting means.

20. A device according to claim 18, wherein said control means is also operative to set said image pickup control means into an initial state.

21. A device according to claim 20, wherein said image pickup control means includes white balance adjusting means for adjusting a white balance of the image signal which is generated from said image pickup means and wherein said image pickup control means operates said white balance adjusting means.

22. A device according to claim 18, wherein said image pickup control means includes white balance adjusting means for adjusting the white balance of the image signal which is generated from said image pickup means and wherein said image pickup control means operates said white balance adjusting means.

23. A device according to claim 22, wherein said optical axis control means sets the optical axis to a predetermined position within a controllable range.

24. A device according to claim 23, further having memory means for storing position information indicative of said predetermined position, and said optical axis control means reads out the position information from said memory means and sets the optical axis to the predetermined position.

25. A device according to claim 18, wherein said control means is also operative to set said optical axis control means into an initial state.

26. A device according to claim 25, wherein said optical axis control means sets the optical axis to a predetermined position within a controllable range.

27. A device according to claim 15, wherein said initialization is executed when a power source of said image input device is turned on.

28. A device according to claim 27, wherein said image pickup means includes focus adjusting means for adjusting the object image to be picked up into an in-focus state;

and said control means controls said image pickup means to operate said focus adjusting means.

29. A device according to claim 27, wherein said image pickup control means includes white balance adjusting means for adjusting the white balance of the image signal which is generated from said image pickup means and wherein said image pickup control means operates said white balance adjusting means.

30. A device according to claim 20, wherein said optical axis control means sets the optical axis to a predetermined position within a controllable range.

31. A device according to claim 30, further having memory means for storing position information indicative of said predetermined position, and said optical axis control means reads out the position information from said memory means and sets the optical axis to the predetermined position.

32. A device according to claim 27, wherein said control means is also operative to set said optical axis control means into an initial state.

33. A device according to claim 32, wherein said optical axis control means sets the optical axis to a predetermined position within a controllable range.

34. An image input device comprising:
   a) image pickup means for picking up an object image;
   b) optical axis control means for enabling an optical axis of said image pickup means to be moved;
   c) first detecting means for detecting a current position of said optical axis moved by said optical axis control means;
   d) second detecting means for physically detecting only an original position of said optical axis in the optical axis control as the current position of said optical axis moved by said optical axis control means; and
   e) control means for controlling the position of the optical axis of said image pickup means in accordance with outputs of said first detecting means and said second detecting means.

35. A device according to claim 34, further comprising input means for inputting a signal indicative of the optical axis position from an external device, and wherein said optical axis control means operates in accordance with the signal inputted by said input means.

* * * * *